Dec. 12, 1967     T. HALASZ ET AL     3,357,837

METHOD AND APPARATUS FOR CONTINUOUS LAUTERING

Filed Jan. 30, 1963     2 Sheets—Sheet 1

INVENTORS
THOMAS HALASZ
RICHARD C. QUITTENTON

BY *Smart & Biggar*
ATTORNEYS

INVENTORS
THOMAS HALASZ
RICHARD C. QUITTENTON
BY Smart & Biggar
ATTORNEYS

United States Patent Office 3,357,837
Patented Dec. 12, 1967

3,357,837
METHOD AND APPARATUS FOR CONTINUOUS LAUTERING
Thomas Halasz and Richard C. Quittenton, London, Ontario, Canada, assignors to John Labatt Limited, London, Ontario, Canada
Filed Jan. 30, 1963, Ser. No. 254,941
Claims priority, application Canada, June 20, 1962, 852,012
17 Claims. (Cl. 99—52)

This invention relates to a method and apparatus for lautering, i.e. straining and recovering wort liquid from mash grains in the brewing of beer.

In our Canadian Patent No. 633,570, Dec. 26, 1961, there is described a continuous lautering process which includes the steps of feeding a mixture of grains and wort liquid from a mashing operation onto a continuously moving perforate belt and collecting a filtrate of wort liquid which passes downwardly through the grains and perforate belt.

It has since been discovered that the efficiency of the continuous lautering process can be greatly improved by utilizing the method of the present invention, which comprises the steps of feeding a mixture of grains and wort liquid from a mashing operation in a brewing process onto the upper flight of a moving continuous perforate belt at a point adjacent one end of the upper flight, regulating the speed of the belt at a point adjacent one end of the upper flight, regulating the speed of the belt and the rate of feed of the mixture thereto to form a moving filtering bed of grain on said belt, collecting a filtrate of wort liquid which has passed downwardly through the bed of grains and perforate belt, subjecting the filtering bed to water spraying or a spray of recycled filtrate, maintaining a head of water or recycled filtrate above the bed of grains, and removing the bed of grains from the belt in the region of the other end of the upper flight.

Preferably, the bed of grain beneath the head of water or filtrate is continuously broken up by rake means.

In a specific method according to the present invention, the bed of grain is passed through a first stage and a second stage, the filtrate passing through the bed of grain in the first stage being recycled to the top of the bed passing through the first stage, and the bed of grains passing through the second stage being subjected to the water spraying, the head of the water or recycled filtrate above the bed of grain being separated by dam means.

Preferably, the upper flight of the moving continuous perforate belt is maintained slightly lower at the feed end and the underside of the upper flight is wiped at the feed end to collect any wort flowing backwards along the underside of the belt.

The apparatus according to the present invention includes an endless perforate belt having an upper flight, one end of the upper flight being the discharge end. Two laterally spaced retaining walls extend up from the upper flight of the belt and are arranged to form a trough therewith. A feed box, which extends between the retaining walls, is located on the upper flight at a position remote from the discharge end and for feeding a mixture of grains and wort liquid to form a bed on the upper flight between the retaining walls, and drive means is provided for driving the upper flight of the perforate belt in a direction away from the box. Collecting means is provided under the upper flight for collecting wort liquid passing downwardly through the bed and the upper flight. At the discharge end, dam means is located between the retaining walls and is arranged to maintain a head of liquid above said bed in advance of the dam means but to permit the bed to pass.

Preferably, rake means are provided to break up the bed as it passes thereunder.

In a preferred embodiment of the invention, at least one additional dam means is located between the retaining walls at a location intermediate the feed box and the dam means near the discharge end of the upper flight whereby to divide the upper flight into at least two separate areas.

Preferably, means are provided to recycle the wort liquid collected below the area near the feed means to the top of the bed at a point near the feed means, and a spray is arranged to spray the bed with water as it passes through at least one of the other areas.

In a specific embodiment of the invention, the dam means includes a transverse shaft mounted for rotation above the bed, and a radial arrangement of axially extending blades secured to the shaft, the blades being arranged to pass between the retaining walls whereby the movement of the bed causes said shaft and the blades secured thereto to rotate.

Preferably, also, the rake means comprises a rake member and drive means for reciprocating the rake means back and forth across the upper flight in a substantially transverse direction with respect to the direction of travel of the upper flight of the belt.

In another preferred embodiment of the invention, the upper flight of the perforate belt is slightly lower at the feed box than at the discharge end, and a collecting box having a wiper blade arranged to wipe the underside of the upper flight is located under the upper flight substantially below the feed means, whereby to deposit in the collection box wort liquid flowing backwards along the underside of the belt.

In the accompanying drawings, which show one embodiment of the invention by way of example:

Figure 1:
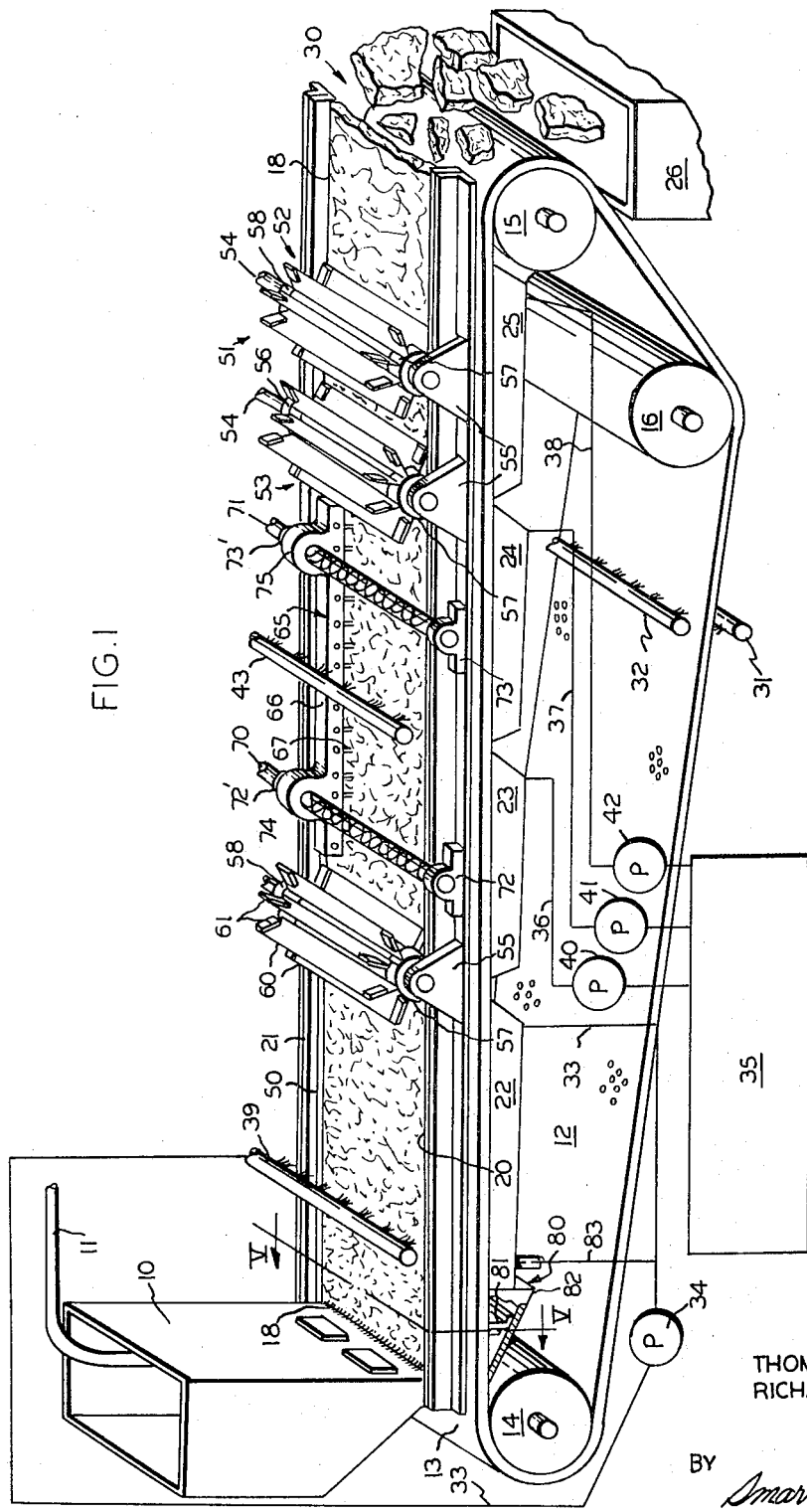
FIGURE 1 is a perspective and partially schematic view of the continuous lautering apparatus.
Figure 2:
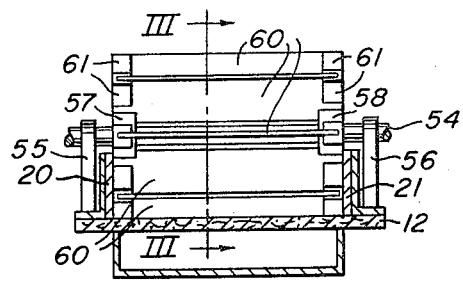
FIGURE 2 is a view of one of the dams.

In FIGURE 1, the reference character 10 denotes a feed box and 11 is a conduit arranged to deliver fresh mash to the box. Beneath the box is a continuous perforate belt 12 having a substantially horizontal upper flight 13. The belt is trained over rolls 14, 15 and 16, at least one of the rolls being a driving roll. The feed box 10 is arranged to deposit the bed of mash 18 on the belt between substantially vertical side retaining walls 20 and 21, which contact the top of the upper flight 13 to form a trough therebetween, as the upper flight 13 is driven by the driving roll in a direction from the feed box 10 towards a discharge end 30.

Collecting means in the form of boxes 22, 23, 24 and 25 are located under the upper flight 13 of the belt 12. A conduit 33 extends from the collection box 22 to a pump 34 and then to a spray head 39 at the top of the bed of mash adjacent the feed box 10. Pumps 40, 41 and 42 are interposed in conduits 36, 37 and 38 which extend from collection boxes 23, 24 and 25, respectively, to a wort collection tank 35. A dried gain collection box 26 is located under the discharge end of the upper flight 13. Spray heads 31 and 32 are engaged to spray the lower flight of the belt 12 with water to remove any grain material still adhering to it.

Figure 4:
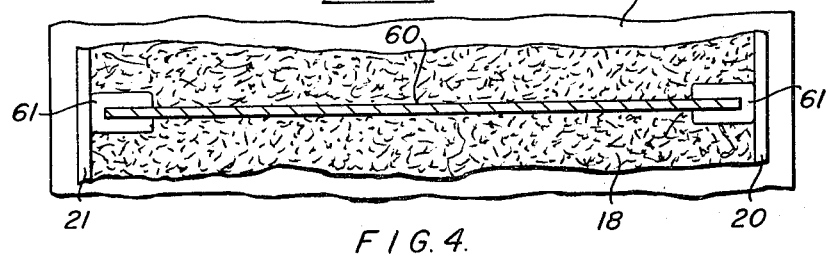
FIGURE 4 is a fragmentary sectional view of a blade of the dam taken along the line IV—IV of FIGURE 3.
Figure 3:
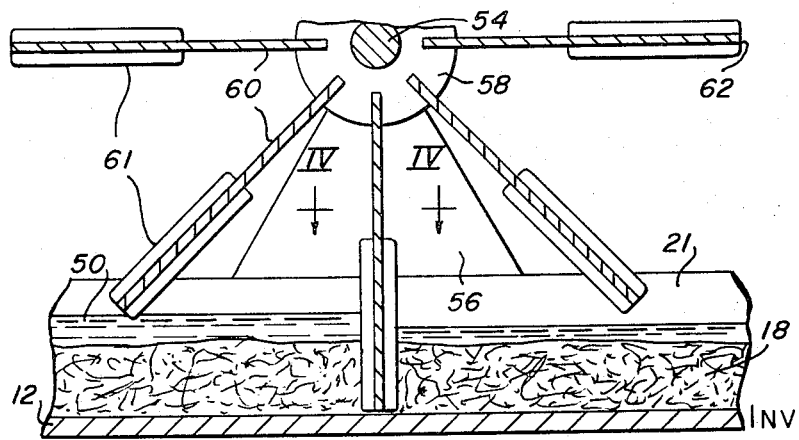
FIGURE 3 is an enlarged sectional view of the dams taken along the line III—III of FIGURE 2.

The apparatus described to this point is similar to that shown in the above-mentioned Canadian Patent No. 633,570. In the apparatus of the present invention, however, there is provided movable dam means 51 at the discharge end of the upper flight. The dam means 51 includes two rotatable dam members 52 and 53 which are very similar to paddle wheels, mounted over the last collection box 25. Each rotating dam member has a transverse shaft 54 mounted to rotate above the retaining walls 20 and 21 in bearing mounts 55 and 56 which are connected to the retaining walls. Hub members 57 and 58 are secured to the shaft substantially above the retaining walls 20 and 21 and a radial arrangement of axially extending blades 60 are fixed between the hub members 57 and 58. The blades 60 are of a length only slightly less than the distance between the retaining walls 20 and 21 and are of sufficient width to extend nearly down to the belt 12 when in the vertical position shown in FIGURE 3. The outer end of the blades have soft rubber strips 61 attached thereto as can best be seen in FIGURES 3 and 4. The strips engage the retaining walls 20 and 21 to improve the sealing effect between the blades and the walls. The blades are so spaced that at least one blade projects into the grain bed on the upper flight at all times so as to prevent the liquid from flowing under the blade. The rotating dam member may be driven at a speed governed by the speed of the belt 12 so that the velocity of the outer edges 62 of the blades is substantially the same as that of the belt, but it has been found that the rotating dam will function very well if it is simply mounted for rotation in the bearing mounts 57 and 58 so as to rotate by the force of the grain bed pushing against the blades 60 as the belt 12 moves forward. The dam means 51 is shown in FIGURE 1 to consist of two rotary dam members 52 and 53, but is, of course, possible to use only one or more than two depending on the conditions of operation, and it can be appreciated that a vertical lift dam or similar device could be adapted for use in the place of the rotating dam member.

Another movable dam means 61, which is shown as being identical to the dam members 52 and 53 described above, is located between the dam means 51 and the feed box 10 to divide the moving bed into two areas. The moving bed of mash in the area between the dam means 61 and the dam means 51 is subjected to a water wash by spraying from a spray head 43 located above the head.

As shown in FIGURE 1, a raking means 65 is provided in the area between the two dam means 51 and 61. The rake means 65 includes a rake member 66, the longitudinal axis of which is substantially parallel to the direction of travel of the belt 12. The rake member 66 is mounted above the bed of mash, but has a plurality of teeth 67 which extend down into the mash. Two drive screw shafts 70 and 71, which extend across the bed, are mounted to rotate in bearings 72, 72' and 73, 73' which are in turn mounted on the retaining walls 20 and 21. The shafts 70 and 71 have a reversing thread cut therein, and detents (not shown) of the bosses 74 and 75 ride in the threads in the usual manner whereby rotation of the shafts 70 and 71 in one direction carry the bosses and the rake member 66 secured to the bosses back and forth across the bed in a substantially transverse direction with respect to the direction of travel of the belt.

Figure 5:
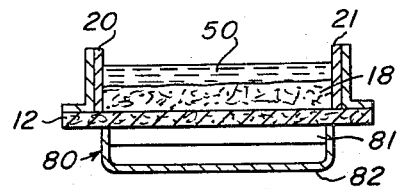
FIGURE 5 is a sectional view taken along the line V—V of FIGURE 1 showing the wiper blade under the upper flight of the belt.

Located under the upper flight of the belt 12 substantially below the feed box 10 is another collection box 80 (see FIGURES 1 and 5). Secured to the inside of the box is a flexible wiper blade 81 which is arranged to engage the underside of the upper flight 13 substantially across the entire width of the belt. The collection box has a slanted bottom 82 and a conduit 83 communicates with the lower part of the box and joins conduit 33 at a point before the pump 34.

In operation, the mash is deposited in the form of a bed 18 on the belt as the upper flight 13 is driven by the driving roll in a direction from the feed box towards a discharge end 30. As the deposited mash begins to move along with the belt, some of the water associated with it, and some of the wort fall freely through the grains and the perforate belt and enter the collection boxes 22 and 80. The material collected in these boxes is preferably recycled by way of the line 33 and pump 34 to the spray head 39 at the top of the bed of mash adjacent the feed box 10. As the deposited mash moves further along with the belt away from the feed box 10, the liquid in the mash drains down through the bed and the perforate belt and collects in collection boxes 23, 24 and 25. From these boxes, the wort is pumped to the wort collection tank 35. Preferably, the pumps 40, 41 and 42 are vacuum pumps whereby the process of drawing off the wort filtrate may be speeded up by applying suction by way of the bosses 23, 24 and 25 to the underside of the upper flight of the belt.

The bed of dried grain, which has had the liquid drained therefrom, breaks away from the upper flight 13 as the latter turns downwardly to follow the contour of the roll 15 and is collected in the box 26. The dried grains may be taken from the box to make various byproducts of the brewing industry, or for greater extraction of the sugar, these grains may, if desired, be repulped in fresh water and filtered on a second lautering unit.

As the bed passes under the spray heads 39 and 43, they are washed with the concentrate from the collection box 22 and with water, respectively, whereby to sparge out residual sugar values in the grain bed. It has been found that the efficiency of the sparging can be improved by maintaining a head of liquid 50 over the bed of mash, and the amount of water issuing from the spray head 43 can be controlled to build up a head of liquid between the retaining walls 20 and 21 above the bed. It is prevented from spilling over the discharge end of the conveyor by the dam means 51. By using movable dam means 61, the head over the first area of the bed adjacent the feed box 10, which is supplied by the spray head 39, and the head over the second area between the dam means 61 and the dam means 51, which is supplied by the spray head 43 are kept separate. It has been found that by keeping the heads above the bed separate, when they are of different concentrations, due to recycling, either straight or counter-current, the efficiency of the sparging is increased. The use of the dam means 61 also permits the liquid levels of the heads of the different areas to be individually controlled, which is desirable. If the apparatus is designed to have more than one recycling stage, it is possible, of course, to use several intermediate dams to provide the required number of separate areas.

An experiment was conducted to establish the difference in yield loss when the units were operated with and without movable dam means. Without any movable dam means, it was found that the spent grains soluble extract loss on dry basis was 19.7%. Three movable dams were then installed on the same units at three feet, twelve feet and fourteen feet from the feed box. The movable dams were of the self-driven rotary type described above. It was found that when using the movable dam, the spent grain soluble extract loss on dry basis was 6.84%. Thus, the yield loss was reduced to approximately ⅓ by employing the movable dams.

As the bed passes between the movable dam means 61 and the movable dam means 51, it is broken up by the rake means 65 which moves continuously back and forth across the bed. The filtering capacity and efficiency depends on the consistency of the bed, and it has been found that by breaking the bed up as it passes one or more points along the upper flight, the process can be operated at a higher speed and more efficiently. Although the rake is shown in the area which is washed with water, the rake may be mounted at a different location on the apparatus, or more than one raking means may be employed.

In an experiment utilizing a unit without rakes and with rakes, the rakes proved to increase the capacity by 70%. A continuous lautering unit operated without rakes yielded 98.1 gallons per hour. A raking means was then mounted on the same unit. The rake utilized was 8 feet wide and had 60 teeth. The length of the teeth gradually increased from the end closest to the feed box to the opposite end. The tooth closest to the feed box was spaced 1¾ inches from the belt and the tooth at the opposite end was spaced 1¼ inches from the belt. The speed of the rakes was 20 sec./ft. The capacity of the units with the rake was 166.5 gallons per hour. Experiments with the rake also indicated a 4.5% yield increase over standard brewery yield since it permits more uniform and thorough washing.

For the best operating results, the whole lautering apparatus is slightly tilted, the feed end of the machine preferably being about 1 inch lower than the discharge end. This facilitates a slight backflow of liquor throughout the whole belt which appears to be beneficial. Consequently, some wort liquid flows backward along the underside of the belt, toward the feed box. The wiper blade 81 wipes the underside of the upper flight and thus collects the wort liquid flowing backwards and directs it down into the collection box 80. From the collection box 80 it drains into the conduit 83 and conduit 33 to be recycled through the spray head 39 to the top of the bed. It has been found in operation that the wiper blades and collection box arrangement can save about 5% of the wort.

What we claim as our invention is:

1. A method of continuous lautering which comprises the steps of feeding a mixture of grains and wort liquid from a mashing operation in a brewing process onto the upper flight of a moving continuous perforate belt at a point adjacent one end of the upper flight, regulating the speed of the belt and the rate of feed of the mixture thereto to form a moving filtering bed of grain on said belt, collecting a filtrate of wort liquid which has passed downwardly through said bed of grains and perforate belt, subjecting the filtering bed to liquid spraying, maintaining a substantially constant head of liquid above a portion of said bed of grains by dam means, and removing said bed of grains from said belt in the region of the other end of said upper flight.

2. A method as defined in claim 1, wherein the bed of grain beneath the head of liquid is continuously broken by rake means.

3. A method as defined in claim 1, wherein suction is applied to part of the underside of said upper flight of said belt to speed the filtering action.

4. A method as defined in claim 1, wherein the bed of grain is passed through a first stage and a second stage, the filtrate passing through the bed of grain and belt in the first stage being recycled to the top of the bed passing through the first stage, and wherein the bed of grains passing through the second stage is subjected to water spraying, the heads of water and recycled filtrate above the bed of grain being separated by dam means.

5. A method as defined in claim 1, wherein the upper flight of the moving continuous perforate belt is maintained slightly lower at the feed end and the underside of the upper flight of the belt is wiped at the feed end whereby to collect any wort flowing backwards along the underside of the belt.

6. A device for continuous lautering comprising an endless perforate belt having an upper flight, one end of the upper flight being the discharge end, two laterally spaced retaining walls extending up from the belt to form a trough therewith, a feed box extending between the retaining walls remote from the discharge end for feeding a mixture of grains and wort liquid to form a bed on the upper flight between said retaining walls, collecting means under the upper flight for collecting wort liquid passing downwardly through said bed and said upper flight, driving means for driving the upper flight of the perforate belt in a direction away from said feed box, and dam means located between said retaining walls near the discharge end and arranged to permit the bed to pass but to maintain a substantially constant head of liquid above the bed in advance of the dam means, said dam means comprising a series of radially extending blades adapted to rotate on a transverse axis above said bed and adapted to pass between said retaining walls.

7. A device as defined in claim 6, further comprising a rake member and drive means for reciprocating the rake member back and forth across the upper flight in a substantially transverse direction with respect to the direction of travel of the upper flight of the belt.

8. A device as defined in claim 7, wherein the rake member has a plurality of teeth arranged to extend downwardly into the bed, the longitudinal axis of the rake member being substantially parallel to the direction of travel of the belt, and the drive means includes a constantly driven screw having a reversing thread thereon, said screw extending across said belt and engaging a boss member secured to said rake member whereby rotation of said screw in one direction drives the rake member back and forth across the upper flight of the belt in a substantially transverse direction with respect to the direction of travel of the belt.

9. A device as defined in claim 6, wherein the dam means comprises a transverse shaft mounted for rotation above the bed and a radial arrangement of axially extending blades secured to said shaft, said blades being arranged to pass between said retaining walls whereby the movement of the bed causes said shaft and the blades secured thereto to rotate.

10. A device as defined in claim 9, wherein the ends of said blades have soft rubber flanges attached thereto, said soft rubber flanges being arranged to engage said retaining walls to ensure an efficient seal between the blades and the retaining walls.

11. A device as defined in claim 6, wherein means are provided to recycle the wort liquid collected from the area of the bed adjacent the feed box to the top of the bed at a point near the feed box.

12. A device as defined in claim 11 further comprising a spray head arranged to spray the bed with water as it passes through at least one of the other areas.

13. A device as defined in claim 11, wherein a rake means is arranged to break up the bed as it passes through at least one of the areas.

14. A device as defined in claim 13, wherein said rake means comprises a rake member and drive means for reciprocating the rake member back and forth across the upper flight in a substantially transverse direction with respect to the direction of travel of the upper flight of the belt.

15. A device as defined in claim 6, wherein the collecting means comprises a plurality of boxes located under the upper flight, at least some of the boxes being arranged to apply suction to the underside of said upper flight of the perforate belt to accelerate the filtering action.

16. A device as claimed in claim 6, wherein the upper flight of the perforate belt is slightly lower at the feed box than at the discharge end, and further comprising a collection box located under the upper flight substantially below the feed box, and a wiper blade in said collection box arranged to wipe the underside of the upper flight whereby to deposit in said collection box any wort liquid flowing backwards along the underside of the belt.

17. A device as defined in claim 13, wherein said rake means comprises a rake member having a plurality of teeth arranged to extend downwardly into the bed, the longitudinal axis of the rake member being substantially parallel to the direction of travel of the belt, and drive means including a constantly driven screw having a reversing thread thereon, said screw extending across said belt and engaging a boss member secured to said rake member whereby rotation of said screw in one direction drives the rake member back and forth across the upper flight of the belt in a substantially transverse direction with respect to the direction of travel of the belt.

References Cited

UNITED STATES PATENTS

| | | | |
|---|---|---|---|
| 2,097,529 | 11/1937 | Nordell | 100—118 X |
| 2,936,236 | 5/1960 | Schwaiger et al. | 99—52 |
| 2,998,351 | 8/1961 | Stoddart et al. | 195—71 |

A. LOUIS MONACELL, *Primary Examiner.*

D. M. NAFF, *Assistant Examiner.*